UNITED STATES PATENT OFFICE 2,456,578

PROCESS OF STABILIZING INORGANIC OXIDE GELS AGAINST WETTING

Ernest A. Bodkin, Pitman, and John W. Payne, Woodbury, N. J., assignors to Socony-Vacuum Oil Company, Incorporated, a corporation of New York No Drawing. Application December 18, 1945, Serial No. 635,760

9 Claims. (Cl. 252—254)

This invention relates to a method for stabilizing dry, inorganic oxide gels when the same are brought into contact with aqueous liquids. More particularly, the invention relates to a novel process in which the shattering of dry gel particles upon wetting with an aqueous liquid is overcome by treatment prior to subjection of the gel to an aqueous wetting liquid with a fluid having a viscosity of at least about 20 centipoises at the temperature of treatment.

The high affinity of inorganic oxide gels for various fluids has long been recognized and this characteristic has, in fact, lead to one of the principal uses of such gels, namely as adsorbents. However, when the dry gels are immersed in aqueous wetting liquids, such as water or water solutions of inorganic compounds, the gel particles tend to disrupt with violence, yielding a mass of small, shattered fragments.

In certain operations employing gels, it is oftentimes expedient to immerse the dry gels in aqueous liquids without causing a shattering of the same into small fragments. For example, in the use of gel particles in various adsorbent processes or in catalytic reactions promoting the conversion of hydrocarbons, it is sometimes necessary to wet the dry gel particles without substantially modifying the shape or size of such particles such as is caused by shattering due to wetting. To take a specific example, inorganic oxide gel particles of spheroidal shape have the advantages of packing in a uniform manner in operations in which a contact bed is employed as in the catalytic cracking of heavy hydrocarbons to lighter material of the nature of gasoline. It is accordingly desirable to retain the spheroidal shape of the formed gel when the dry particles are subjected in various process steps to aqueous wetting liquids. Likewise, in other processes dry gel particles of particular shape or even irregularly shaped fragments should suitably retain their original form when immersed in aqueous liquids which penetrate into the pores of the gel.

Attempts have been made in the past to overcome the difficulties arising by the shattering of dry gel particles when they are subjected to wetting. Some degree of success has been attained by placing the particles under a vacuum of less than 0.1 mm. of mercury and then immersing the particles into a desired aqueous liquid without a release of the vacuum. However, because of the high vacuum requirement, this method has not been considered to be particularly satisfactory and even when conducted on a small scale it requires a relatively difficult operating technique.

In accordance with the present invention, a novel method of preventing the shattering of dry gels has now been found. This method comprises saturating the dry gel with a water miscible, relatively viscous fluid prior to subjecting the gel to the aqueous wetting liquid. Thus, the dry gel particles to be treated are soaked in a water miscible fluid having a viscosity of at least about 20 centipoises for a period of time sufficient to become saturated. This soaking period may vary from a relatively short time to several hours, depending upon the particular fluid or solution employed and the viscosity thereof. In general, the temperature remaining constant, the more viscous treating fluids will require a greater time for saturation of the gel particles. It has been established, however, in accordance with this invention that the treating fluid should have a viscosity of at least about 20 centipoises at the temperature of treatment. This lower limit in viscosity of the treating fluid is critical, as will be shown hereinafter.

The nature of the treating fluid may be varied over wide limits, the only exception being that it possess a viscosity of at least about 20 centipoises. Thus, both naturally liquid materials and organic or inorganic solutions having a viscosity greater than this critical value were found to function effectively in eliminating the shattering of dry gel particles upon wetting with aqueous liquids. Relatively viscous solutions of high molecular weight organic compounds, such as the sugars, and high molecular inorganic materials, such as silicate solutions, were found to be particularly effective treating liquids. Upon soaking the dry gel particles in the viscous treating liquid, the air contained in the gel pores is replaced by said liquid. The gel may then be immersed in an aqueous wetting liquid without any accompanying shattering or breaking. The following examples will serve to illustrate the invention without limiting the same:

*Example 1*

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was eight feet. The globules of solution fell through the oil and gelled before passing into a layer of water located beneath the oil. The time of gelation for the concentrations and proportions of reactants given above was about 4 seconds. The spherical particles of gel were conducted out of the bottom of the column into a stream of water and on removal from the water base exchanged with an aqueous solution of aluminum sulfate and water-washed. The pellets were then slowly and uniformly dried in super-heated steam at about 300° F. until shrinkage was substantially complete and the drying was continued at a gradually increasing temperature up to 1300° F., which temperature was maintained for ten hours. The silica-alumina gel retained its spheroidal shape during the washing and drying operations.

A sample of the dry, spheroidal gel pellets was soaked for two hours at a temperature of 25° C. in a sucrose solution containing 180 grams of sucrose in 100 cc. of water and having a viscosity of 98 centipoises. After this treatment, the pellets were brought into contact with aqueous solution containing 25% by weight sodium hydroxide and completely soaked at room temperature. Subsequent examination showed that the yield of unbroken pellets was 100%.

A second sample of the dry, spheroidal gel pellets was soaked in an aqueous solution containing 25% by weight sodium hydroxide. The yield of unbroken pellets in this instance was nil, indicating that the soaking pretreatment of the dry gel particles with sucrose solution has eliminated shattering of the gel upon wetting.

*Example 2*

A number of samples of dry gel pellets, prepared according to Example 1, were soaked at 25° C. in a series of aqueous solutions of sucrose containing varying quantities of the solute until the gel was saturated with liquid. After soaking, the pellets were brought into contact with water and completely soaked.

The relationship between the concentration of sucrose solution, its viscosity, and the breakage of gel pellets is shown in the table below:

| Percentage Weight of Sucrose in Aqueous Solution | Viscosity of Sucrose Solution in Centipoises | Percentage of Gel Pellets Broken | |
| --- | --- | --- | --- |
| | | On Soaking in Sucrose Solution | On Subsequent Soaking in Water |
| 64.3 | 98 | 0 | 0 |
| 57.5 | 28 | 0 | 0 |
| 55.5 | 19 | 10 | 0 |
| 54.5 | 16 | 50 | 0 |
| 31.1 | 3.4 | 70 | 0 |

From the above table it will be evident that sucrose solutions having a viscosity of at least about 20 centipoises are effective treating solutions in preventing breakage of the dry gel particles.

*Example 3*

A number of samples of dry gel particles, prepared according to Example 1, were soaked at 25° C. in a series of aqueous solutions of dextrin (corn gum) containing varying quantities of the solute until the gel was saturated with liquid. After soaking, the particles were brought into contact wtih water and completely soaked.

The relationship between the concentration of dextrin solution, its viscosity and the breakage of gel particles is shown in the table below:

| Percentage Weight of Dextrin in Aqueous Solution | Viscosity of Dextrin Solution in Centipoises | Percentage of Gel Pellets Broken | |
| --- | --- | --- | --- |
| | | On Soaking in Dextrin Solution | On Subsequent Soaking in Water |
| 64.3 | ------ | 0 | 0 |
| 57.5 | 685 | 0 | 0 |
| 31.1 | ------ | 70 | 0 |

From the above table, it will be seen that viscous dextrin solutions are effective treating liquids for preventing the breakage of dry gel particles.

*Example 4*

A number of samples of dry gel particles, prepared according to Example 1, were soaked at 25° C. in a series of aqueous solutions of sodium silicate containing varying quantities of the solute until the gel was saturated with liquid. After soaking, the particles were brought into contact with water and completely soaked. The relationship between the concentration of the sodium silicate solution, its viscosity and the breakage of the gel particles is shown in the table below:

| Percentage Weight of Sodium Silicate in Aqueous Solution | Viscosity of Sodium Silicate Solution in Centipoises | Percentage of Gel Pellets Broken | |
| --- | --- | --- | --- |
| | | On Soaking in Sodium Silicate Solution | On Subsequent Soaking in Water |
| 37.6 | 226 | 0 | 0 |
| 28.2 | 23 | 0 | 0 |
| 26.1 | 18 | 0 | 0 |
| 24.0 | 15 | 90 | 0 |

From the above table, it will be evident that sodium silicate solutions having a viscosity of at least about 20 centipoises are effective treating solutions for preventing breakage of dry gel particles.

The above examples will indicate to those skilled in the art that by treating the dry gel particles with a water miscible solution having a viscosity of at least about 20 centipoises at the temperature of treatment, the shattering of the gel upon contact with an aqueous wetting liquid has been overcome. Thus, if it is desired to wet a dry gel with an aqueous liquid such as water or dilute aqueous solutions, suitable pretreating liquids include solutions of high molecular weight, organic compounds such as sugar solutions and closely related materials such as the polysaccharoses, of which dextrin is a representative example. Also, relatively viscous, inorganic solutions may be employed as pretreating liquids. Thus, silicate solutions, of which sodium silicate is representative, having a viscosity greater than 20 centipoises at the temperature of treatment, have been found to be effective for preventing gel breakage on subsequent wetting. The present invention is thus confined to treatment of a dry gel, prior to wetting, with relatively viscous liquids which are water miscible and which have a viscosity of at least about 20 centipoises at the temperature of treatment.

While the invention has been illustrated with spheroidal pellets of silica-alumina gel, other dry inorganic oxide gels of any specified shape may be treated by the process described above to render them stable when they are subjected to a wetting liquid. Thus, the present invention contemplates stabilization against disruption upon wetting of dry gels of silica, silica-zirconia, silica-beryllia, silica-stannic oxide, silica-ceria, silica-thoria, and the like.

The time of presoaking treatment in the relatively viscous solution does not appear to be critical, it being only necessary that the gel particle be substantially saturated with the liquid before wetting. As those in the art will understand, the viscosity of the treating liquid will vary with the temperature. However, in accordance with the present invention, it has been found that a viscosity of at least about 20 centipoises at the treating temperature is critical if the treating liquid is to function effectively in eliminating breakage of the dry gel particles.

According to the most widely accepted theory of dry gel structure, the water normally present in the freshly formed gel is held by capillary action. As the gel dries, the water in the capillary gel structure is replaced by air. While the present invention is, of course, not limited by any theory, it is believed that the disruption of the dry gel particles upon wetting with an aqueous liquid is due to the compression of the air in the gel pores by the rapid infiltration of an aqueous liquid to increase the internal pressure to such a point that the gel particles fly apart in a violent manner. When the air normally present is replaced as in the instant invention with a relatively viscous liquid in which the entrained air is slowly dissolved by the viscous liquid, disruption of the gel does not occur since the diffusion of the relatively viscous treating liquid into the gel is sufficiently slow to dissolve the air within the gel pores and hence to obviate formation of a disruptive air pressure within the gel. Thus, it is thought that there is substantially no internal pressure developed within the gel when it is immersed in a treating liquid having a viscosity of at least about 20 centipoises and, hence, no disruption of the gel occurs when it is subsequently subjected to an aqueous wetting liquid.

It is to be clearly understood that the above-described preliminary treatment and subsequent wetting with an aqueous liquid applies to the dry, formed gel, and does not include any treatment involved in the preparation of such gels or in the treatment of wet or partially processed moist gels.

We claim:

1. A method of stabilizing a dry inorganic oxide gel against disruption upon wetting with an aqueous liquid capable of causing said disruption, comprising effecting a substantial saturation of the gel with a water-miscible liquid having a viscosity of at least about 20 centipoises at the temperature of treatment and maintaining said substantial saturation of the gel until contact thereof with said aqueous liquid.

2. A method of stabilizing a dry inorganic oxide gel against disruption upon wetting with water, comprising effecting a substantial saturation of the gel with a water-miscible liquid having a viscosity of at least about 20 centipoises at the temperature of treatment and maintaining said substantial saturation of the gel until contact thereof with water.

3. A method of stabilizing a dry inorganic oxide gel against disruption upon wetting with an aqueous liquid capable of causing said disruption, comprising effecting a substantial saturation of the gel with a water-miscible sugar solution having a viscosity of at least about 20 centipoises at the temperature of treatment and maintaining said substantial saturation of the gel until contact thereof with said aqueous liquid.

4. A method of stabilizing a dry inorganic oxide gel against disruption upon wetting with an aqueous liquid capable of causing said disruption, comprising effecting a substantial saturation of the gel with a water-miscible silicate solution having a viscosity of at least about 20 centipoises at the temperature of treatment and maintaining said substantial saturation of the gel until contact thereof with said aqueous liquid.

5. A method of stabilizing a dry inorganic oxide gel against disruption upon wetting with an aqueous liquid capable of causing said disruption, comprising effecting a substantial saturation of the gel with a sucrose solution having a viscosity of at least about 20 centipoises at the temperature of treatment and maintaining said substantial saturation of the gel until contact thereof with said aqueous liquid.

6. A method of stabilizing a dry inorganic oxide gel against disruption upon wetting with an aqueous liquid capable of causing said disruption, comprising effecting a substantial saturation of the gel with a dextrin solution having a viscosity of at least about 20 centipoises at the temperature of treatment and maintaining said substantial saturation of the gel until contact thereof with said aqueous liquid.

7. A method of stabilizing a dry inorganic oxide gel against disruption upon wetting with an aqueous liquid capable of causing said disruption, comprising effecting a substantial saturation of the gel with an alkali metal silicate solution having a viscosity of at least about 20 centipoises at the temperature of treatment and maintaining said substantial saturation of the gel until contact thereof with said aqueous liquid.

8. A method of stabilizing a dry siliceous gel against disruption upon wetting with an aqueous liquid capable of causing said disruption, comprising effecting a substantial saturation of the gel with a water-miscible liquid having a viscosity of at least about 20 centipoises at the temperature of treatment and maintaining said substantial saturation of the gel until contact thereof with said aqueous liquid.

9. A method of stabilizing dry spheroidal inorganic oxide gel particles against disruption upon wetting with an aqueous liquid capable of causing said disruption, comprising effecting a substantial saturation of the gel with a water-miscible liquid having a viscosity of at least about 20 centipoises at the temperature of treatment and maintaining said substantial saturation of the gel until contact thereof with said aqueous liquid.

ERNEST A. BODKIN.
JOHN W. PAYNE.

REFERENCES CITED

The following references are of record in the file of this patent:

UNITED STATES PATENTS

| Number | Name | Date |
|---|---|---|
| 1,798,766 | Stoewener | Mar. 31, 1931 |
| 1,935,178 | Connolly | Nov. 14, 1933 |
| 2,211,745 | Stephenson | Aug. 13, 1940 |
| 2,385,217 | Marisic | Sept. 18, 1945 |
| 2,396,051 | Lans | Mar. 5, 1946 |

FOREIGN PATENTS

| Number | Country | Date |
|---|---|---|
| 386,760 | Germany | Dec. 15, 1923 |